(12) United States Patent
Puckett et al.

(10) Patent No.: US 10,281,646 B2
(45) Date of Patent: May 7, 2019

(54) ETCHLESS ACOUSTIC WAVEGUIDING IN INTEGRATED ACOUSTO-OPTIC WAVEGUIDES

(71) Applicant: Honeywell International Inc., Morris Plains, NJ (US)

(72) Inventors: Matthew Wade Puckett, Scottsdale, AZ (US); Jianfeng Wu, Tucson, AZ (US); Mary Salit, Plymouth, MN (US); Tiequn Qiu, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/591,836

(22) Filed: May 10, 2017

(65) Prior Publication Data

US 2018/0081113 A1 Mar. 22, 2018

Related U.S. Application Data

(60) Provisional application No. 62/397,068, filed on Sep. 20, 2016.

(51) Int. Cl.
*G02B 6/122* (2006.01)
*G01C 19/72* (2006.01)
(Continued)

(52) U.S. Cl.
CPC ........... *G02B 6/122* (2013.01); *G01C 19/722* (2013.01); *G02F 1/025* (2013.01); *G02F 1/125* (2013.01); *G02F 1/353* (2013.01); *G10K 11/20* (2013.01)

(58) Field of Classification Search
CPC .................................... G02B 6/12; G02B 6/14
(Continued)

(56) References Cited

U.S. PATENT DOCUMENTS 3,856,378 A 12/1974 Brandt et al.
4,181,904 A * 1/1980 Weller .................. G06G 7/195
257/416

(Continued)

FOREIGN PATENT DOCUMENTS

EP 0642052 3/1995
EP 0642052 A1 3/1995
(Continued)

OTHER PUBLICATIONS

Courjal et al, "High Aspect Ratio Lithium Niobate Ridge Waveguides Fabricated by Optical Grade Dicing", Journal of Physics, https: //hal.archives-ouvertes.fr/hal-00637796, Dated Nov. 3, 2011, pp. 1-13, Publisher: IOP Publishing,.
(Continued)

*Primary Examiner* — Kaveh C Kianni
(74) *Attorney, Agent, or Firm* — Fogg & Powers LLC

(57) ABSTRACT

An acousto-optic waveguide device comprises a substrate comprising a first material having a first refractive index and a first acoustic velocity; a cladding layer over the substrate, the cladding layer comprising a second material having a second refractive index that is distinct from the first refractive index, the second material having a second acoustic velocity that is distinct from the first acoustic velocity; and an optical core surrounded by the cladding layer, the optical core comprising a third material having a third refractive index that is higher that the first refractive index and the second refractive index, the third material having a third acoustic velocity that is distinct from the first acoustic velocity and the second acoustic velocity. The cladding layer that surrounds the optical core has a thickness configured to substantially confine acoustic waves to the cladding layer when an optical signal propagates through the optical core.

8 Claims, 5 Drawing Sheets

(51) Int. Cl.
    *G10K 11/20*     (2006.01)
    *G02F 1/025*     (2006.01)
    *G02F 1/125*     (2006.01)
    *G02F 1/35*     (2006.01)

(58) Field of Classification Search
    USPC .................................................. 385/3
    See application file for complete search history.

(56) References Cited

U.S. PATENT DOCUMENTS

| | | | |
|---|---|---|---|
| 5,131,060 A | 7/1992 | Sakata | |
| 5,138,687 A | 8/1992 | Horie et al. | |
| 5,170,457 A | 12/1992 | Jen | |
| 5,329,397 A | 7/1994 | Chang | |
| 5,400,788 A * | 3/1995 | Dias | A61B 8/0833 |
| | | | 600/459 |
| 5,511,142 A | 4/1996 | Horie et al. | |
| 5,781,669 A | 7/1998 | Schmid et al. | |
| 5,841,913 A | 11/1998 | Marcuse et al. | |
| 6,052,215 A | 4/2000 | Montgomery et al. | |
| 6,233,379 B1 | 5/2001 | Kim et al. | |
| 6,253,002 B1 | 6/2001 | Kim et al. | |
| 6,266,462 B1 | 7/2001 | Kim et al. | |
| 6,282,332 B1 | 8/2001 | Bosso et al. | |
| 6,510,261 B2 | 1/2003 | Sorin et al. | |
| 6,535,665 B1 | 3/2003 | Kim et al. | |
| 6,542,683 B1 | 4/2003 | Evans et al. | |
| 6,587,623 B1 | 7/2003 | Papen et al. | |
| 6,636,201 B1 * | 10/2003 | Gomes | G06F 3/0436 |
| | | | 178/18.04 |
| 6,718,110 B2 | 4/2004 | Carmannini et al. | |
| 6,925,216 B2 | 8/2005 | Vernon et al. | |
| 6,929,899 B2 | 8/2005 | Pottebaum et al. | |
| 6,999,639 B2 | 2/2006 | Tsarev | |
| 7,016,586 B2 | 3/2006 | Zoorob et al. | |
| 7,062,109 B2 | 6/2006 | Tsunoda et al. | |
| 7,103,245 B2 | 9/2006 | Lee et al. | |
| 7,174,080 B2 | 2/2007 | Walker | |
| 7,376,317 B2 | 5/2008 | Yamada | |
| 8,078,021 B2 | 12/2011 | Ushida | |
| 8,442,368 B1 | 5/2013 | Reano et al. | |
| 8,560,048 B2 | 10/2013 | Eberle et al. | |
| 10,041,797 B2 | 8/2018 | Jain et al. | |
| 2003/0156813 A1 | 8/2003 | Terakawa et al. | |
| 2003/0161375 A1 | 8/2003 | Filgas et al. | |
| 2003/0176002 A1 | 9/2003 | Zhang et al. | |
| 2004/0037532 A1 | 2/2004 | Park et al. | |
| 2004/0105485 A1 | 6/2004 | Bures et al. | |
| 2005/0286826 A1 | 12/2005 | Tsunoda et al. | |
| 2006/0037532 A1 | 2/2006 | Eidson | |
| 2006/0171648 A1 | 8/2006 | Hasegawa | |
| 2008/0013906 A1 | 1/2008 | Matsuo et al. | |
| 2009/0148112 A1 | 6/2009 | Koyamada et al. | |
| 2009/0263092 A1 | 10/2009 | Flammer et al. | |
| 2010/0092132 A1 | 4/2010 | Ushida | |
| 2010/0238538 A1 * | 9/2010 | Rice | C03B 37/01211 |
| | | | 359/334 |
| 2011/0081123 A1 | 4/2011 | Pare et al. | |
| 2012/0189258 A1 | 7/2012 | Overton et al. | |
| 2013/0170802 A1 | 7/2013 | Pitwon | |
| 2013/0188918 A1 | 7/2013 | Painchaud et al. | |
| 2014/0320863 A1 | 10/2014 | Christensen et al. | |
| 2015/0288135 A1 | 10/2015 | Qiu et al. | |
| 2018/0081112 A1 | 3/2018 | Puckett et al. | |
| 2018/0081113 A1 | 3/2018 | Puckett et al. | |
| 2018/0081115 A1 | 3/2018 | Puckett et al. | |
| 2018/0081205 A1 | 3/2018 | Puckett | |
| 2018/0081206 A1 | 3/2018 | Puckett et al. | |

FOREIGN PATENT DOCUMENTS

| | | |
|---|---|---|
| EP | 0969297 | 1/2000 |
| EP | 0969297 A1 | 1/2000 |
| WO | 2004027476 | 4/2004 |

OTHER PUBLICATIONS

Laude et al, "Generation of Photons from Electrostriction in Small-Core Optical Waveguides", AIP Advances 3, 042109, Dated 2013, pp. Cover, 042109-1-042109-12, Publisher:American Institute of Physics.

Laude et al, "Lagrangian Description of Brillouin Scattering and Electrostriction in a Nanoscale Optical Waveguides", New Journal of Physics, Dated 2015, http://iopscience.iop.org/1367-2630/17/12/125003, Downloaded Dec. 12, 2015, Publisher: IOP Publishing.

Normandin et al, "Scattering of Guided Optical Beams by Surface Acoustic WAves in Thin Films", Journal of Optical Society of America, Dated Aug. 1979, pp. 1153-1165, vol. 69, No. 8, Publisher: Optical Society of America.

Pennec et al, "Modeling Light-Sound Interaction in Nanoscale Cavities and Waveguides", Nanophotonics 2014; 3(6), pp. 413-440, Publisher: Science Wise Publishing & De Gruyter.

Puckett et al., "Brillouin Gain Spectral Position Control of Claddings for Tuning Acousto-Optic Waveguides", U.S. Appl. No. 15/630,261, filed Jun. 22, 2017, Jun. 22, 2017, pp. 1-20, Published in: US.

Robinson, "A Dissertation presented to the Faculty of the Graduate School of Cornell University, Nanoscale Light Confinement: Principles, Measurement, and Applications", Dated Jan. 2009, pp. 1-108, : Publisher: Jacob Thomas Robinson.

Rowell et al, "Brillouin Scattering in a Thin Film Waveguide", Applied Physics Letters, 32(3), https://doi.org/10.1063/1.89965, Dated Feb. 1, 1978, pp. Cover,154-155, Publisher: American Institute of Physics.

Schmidt et al, "Thin Film Acoustic Surface Waveguides on Anisotropic Media", IEEE Transactions on Sonics and Ultrasonics, Dated Mar. 1975, pp. 115-122, vol. SU-22, No. 2, Publisher: IEEE.

Seshadri, "Quasi-optics of the Coupling of Guided Modes in Two Paralles, Indentical Dielectric Waveguides", Journal Optical Society of America, Dated Jun. 1987, pp. 1030-1036, vol. 4, No. 6, Publisher: Optical Society of America.

U.S. Patent and Trademark Office, "Advisory Action" for U.S. Appl. No. 15/379,165, dated Apr. 6, 2018, pp. 1-14, Published in: US.

U.S. Patent and Trademark Office, "Restriction Requirement" for U.S. Appl. No. 15/636,474, dated Apr. 4, 2018, pp. 1-13, Published in: US.

Wolff et al, "Germanium as a Material for Stimulated Brillouin Scattering in the Mid-infrared", Optics Express, Dated: Dec. 15, 2014, pp. 30735-30747, vol. 22, No. 25, Publisher: OSA.

Yasumoto et al, "Numerical Analysis of Two-Parallel Embedded Optical Waveguides", Journal Optical Society of America, Dated Sep. 1987, pp. 1713-1719, vol. 4, No. 9, Publisher: Optical Society of America.

Yasuura et al, "Numerical Analysis of Thin-Film Waveguide by Mode-Matching Method", Journal Optical Society of America, Dated Feb. 1980, pp. 183-191, vol. 70, No. 2, Publisher: Optical Society of America.

U.S. Patent and Trademark Office, "Office Action", from U.S. Appl. No. 15/591,747, dated Dec. 14, 2017, pp. 1-21, Published in: US.

U.S. Patent and Trademark Office, "Final Office Action", from U.S. Appl. No. 15/379,165, dated Dec. 20, 2017, pp. 1-20, Published in: US.

European Patent Office, "Extended European Search Report for EP Application No. 17181056.7", from Foreign Counterpart to U.S. Appl. No. 15/636,480, dated Jan. 2, 2018, pp. 1-7, Published in: EP.

Barrios, Carlos et al, "Optical Slot-Waveguide Based Biochemical Sensors", Sensors, www.mdpi.com/journal/sensors, Jun. 16, 2009, pp. 4751-4765.

Bian, Dandan et al, "Design of a Polymer-filled Silicon Nitride strip/slot asymmetric hybrid waveguide for realizing both flat dispersioin and athermal operation", Applied Optics, Jun. 20, 2016, pp. 4827-4832, vol. 55, No. 18, Publisher: Optical Society of America.

Ma, Tian-Xue et al, "Acousto-optical interaction of surface acoustic and optical waves in a two-dimensional phoxonic crystal heterostructure cavity", Optics Express, Nov. 17, 2014, pp. 28443-28451, vol. 22, No. 23, Publisher: Optical Society of America.

(56) References Cited

OTHER PUBLICATIONS

Mirnaziry, Sayyed Reza et al, "Stimulated Brillouin Scattering in Silicon/Chalcogenide Slot Waveguides", Optic Express, Feb. 25, 2016, pp. 4786-4800, vol. 24, No. 5, Publisher: Optical Society of America.
Puckett, Matthew et al, "Silicon nanoridge array waveguides for nonlinear and sensing applications", Optics Express, Nov. 2, 2015, pp. 28224-28233, vol. 23, No. 22, Publisher: Optical Society of America.
Puckett, Matthew et al, "Observation of second-harmonic generation in silicon nitride waveguides through bulk nonlinearities", pp. 1-10.
Rahman et al, "Characterization of Acousto-optical Interaction in Planar silica optical waveguide by the finite element method", Journal of the Optical Society of America B, May 1, 2016, pp. 810-818, vol. 33, No. 5, Publisher: Optical Society of America.
Sarabalis, Christopher et al, "Guided acoustic and optical waves in silicon-on-insulator for Brillouin scattering and optomechanics", Physics Optics, Apr. 16, 2016, pp. 1-5.
Sriratanavaree et al, "Rigorous Characterization of acoustic-optical interactions in silicon slot waveguides by full-vectorial finite element method", Optics Express, Apr. 21, 2014, pp. 9528-9537, vol. 22, No. 8, Publisher: Optical Society of America.
Sriratanavaree et al, "Rigorous analysis of acoustic modes in low and high index contrast silica fibers", Applied Optics, Mar. 20, 2015, pp. 2550-2557, vol. 54, No. 9, Publisher: Optical Society of America.
Vanlaer, Raphael et al, "Interaction between light and highly confined hypersound in a silicon photonic nanowire", Physics Optics, Jul. 18, 2014, pp. 1-10.
Vanlear, Raphael et al, "Analysis of enhanced stimulated Brillouin scattering in silicon slot waveguides", Optics Letters, Mar. 1, 2014, pp. 1242-1245, vol. 39, No. 5, Publisher: Optical Society of America.
Wang, Zheng et al, "Slow light through tightly coupled light waves and acoustic waves in nanoscale waveguides", "Proceedings of Spie", SPIEDigitalLibrary.org/conference-proceedings-of-spie, Mar. 6, 2013, pp. 1-14, vol. 8636.
Zhang et al., "Analysis of acousto-optic interaction based on forward stimulated Brillouin scattering in hybrid phononic-photonic waveguides", Optics Express, Jun. 13, 2016, pp. 13051-13059, vol. 24, No. 12.
European Patent Office, "Extended European Search Report for EP Application No. 17180384.4", Foreign Counterpart to U.S. Appl. No. 15/636,474, dated Jan. 5, 2018, pp. 1-8, Published in: EP.
European Patent Office, "Extended European Search Report for EP Application No. 17178890.4", Foreign Counterpart to U.S. Appl. No. 15/591,747, dated Jan. 11, 2018, pp. 1-11, Published in: EP.
European Patent Office, "Extended European Search Report for EP Application No. 17178891.2", Foreign Counterpart to U.S. Appl. No. 15/591,836, dated Jan. 11, 2018, pp. 1-11, Published in: EP.
European Patent Office, "Extended European Search Report for EP Application No. 17178894.6", Foreign Counterpart to U.S. Appl. No. 15/379,165, dated Jan. 17, 2018, pp. 1-11, Published in: EP.
Eggleton et al, "Inducing and Harnessing Stimulated Brillouin Scattering in Photonic Integrated Circuits", Advances in Optics and Photonics 5, Dec. 19, 2013, pp. 536-587, Publisher: Optical Society of America.
Poulton et al, "Acoustic Confinement and Stimulated Brillouin Scattering in Integrated Optical Waveguides", Journal of the Optical Society of America B, Oct. 1, 2013, pp. 2657-2664, vol. 30, No. 10, Publisher: Optical Society of America.
Rakich et al, "Traveling-wave Photon-phonon Coupling as the Basis for New Signal Processing Technologies", Micro-and Nanotechnology Sensors, Systems, and Applications VI, pp. 908317-1-908317-12, vol. 9083, Publisher: SPIE.
Shin et al, "Tailorable Stimulated Brillouin Scattering in Nanoscale Silicon Waveguides", Nature Communications, Jun. 6, 2013, pp. 1-10, Publisher: Macmillan Publishers Limited.
United States Patent and Trademark Office, "Restriction Requirement", from U.S. Appl. No. 15/379,165, dated Mar. 24, 2017, pp. 1-6, Published in: US.
Shin et al., "Tailorable Stimulated Brillouin Scattering in Nanoscale Silicon Waveguides", Nature Communications www.nature.com/naturecommunications, Jun. 6, 2013, pp. 1-10, Publisher: Macmillan Publishers Limited.
Puckett et al., "Double-Layer High-Confinement Acousto-Optic Waveguide", U.S. Appl. No. 15/379,165, filed Dec. 14, 2016, pp. 1-21.
United States Patent and Trademark Office, "Office Action", from U.S. Appl. No. 15/379,165, dated Jun. 16, 2017, pp. 1-14, Published in: US.
Sriratanavaree, "Characterisation of Acoustic Waves in Optical Waveguides", A Thesis Submitted for the Degree of Philosophy, Jan. 2014, pp. 1-233, Publisher: City University London, Published in: GB.
U.S. Patent and Trademark Office, Office Action from U.S. Appl. No. 15/636,474 dated Aug. 31, 2018, p. 1-44, Published in: U.S.
Ashraf Mohamedelhassan, "Fabrication of Ridge Waveguides in Lithium Niobate", Printed by Universitetsservice US AB, 2012, pp. i-58, No. ISSN: 0280-316X, Publisher: Royal Institute of Technology KTH, Published in: Stockholm, Sweden.
Bauters et al., "Planar Waveguides With Less Than 0.1 dB/m Propagation Loss Fabricated With Wafer Bonding", https://doi.org/10.1364/OE.19.024090, 2011, pp. 1-12, Publisher: Optical Society of America.
Bogaerts, Wim et al. "Silicon microring resonators"; Laser Photonics Rev. 6, No. 1, pp. 47-73 (2012); www.lpr-journal.org.
Sarabalis, Christopher et al., "Guided acoustic and optical waves in silicon-on-insulator for Brillouin scattering and optomechanics", APL Photonics, Apr. 19, 2016.
U.S. Patent and Trademark Office, "Office Action"; U.S. Appl. No. 15/591,747; dated May 18, 2018; pp. 1-18; Published in: US.
U.S. Patent and Trademark Office; "Office Action"; U.S. Appl. No. 15/379,165; dated May 18, 2018; pp. 1-30; Published: US.
U.S. Patent and Trademark Office; "Restriction Requirement"; U.S. Appl. No. 15/630,261; dated Apr. 23, 2018; pp. 1-6; Published: US.
U.S. Patent and Trademark Office; "Restriction Requirement"; U.S. Appl. No. 15/379,165; dated Mar. 24, 2017; pp. 1-6; Published: US.
U.S. Patent and Trademark Office, "Office Action", U.S. Appl. No. 15/636,480, dated Jul. 12, 2018, pp. 1-45, Published: US.
Li et al., "Characterization of a high coherence, Brillouin microcavity laser on silicon", T.J Watson Laboratory of Applied Physics, California Institute of Technology, 2012, pp. 1-11, Published in: US.
U.S. Patent and Trademark Office, "Final Office Action from U.S. Appl. No. 15/591,747 dated Oct. 12, 2018", pp. 1-23, Published in: US.
U.S. Patent and Trademark Office, "Notice of Allowance for U.S. Appl. No. 15/630,261 dated Oct. 10, 2018", pp. 1-37, Published in: US.

* cited by examiner

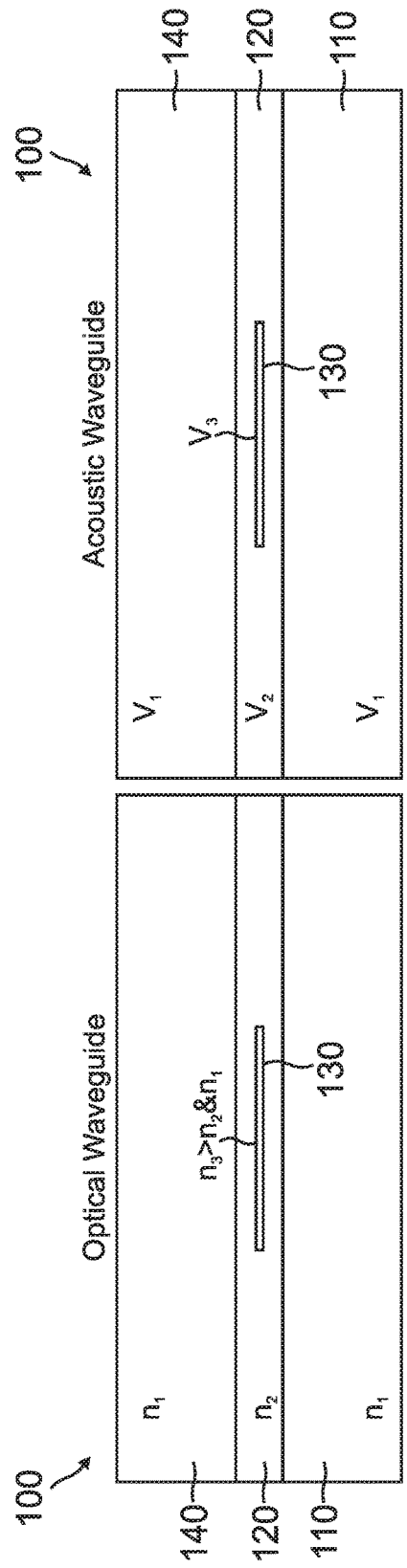

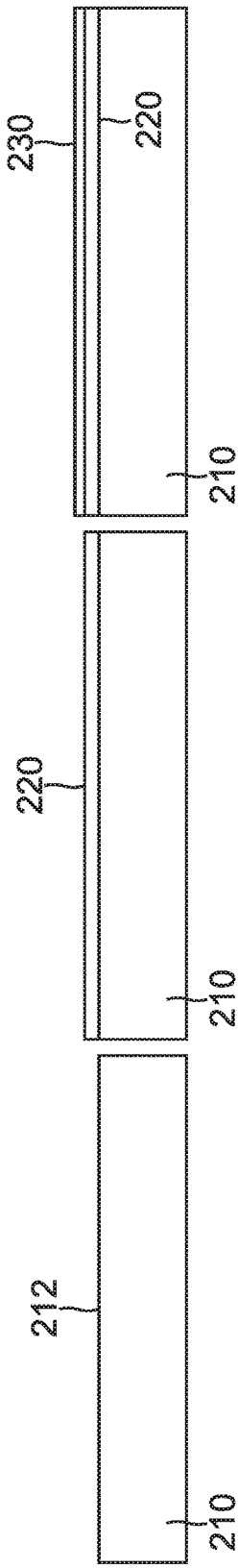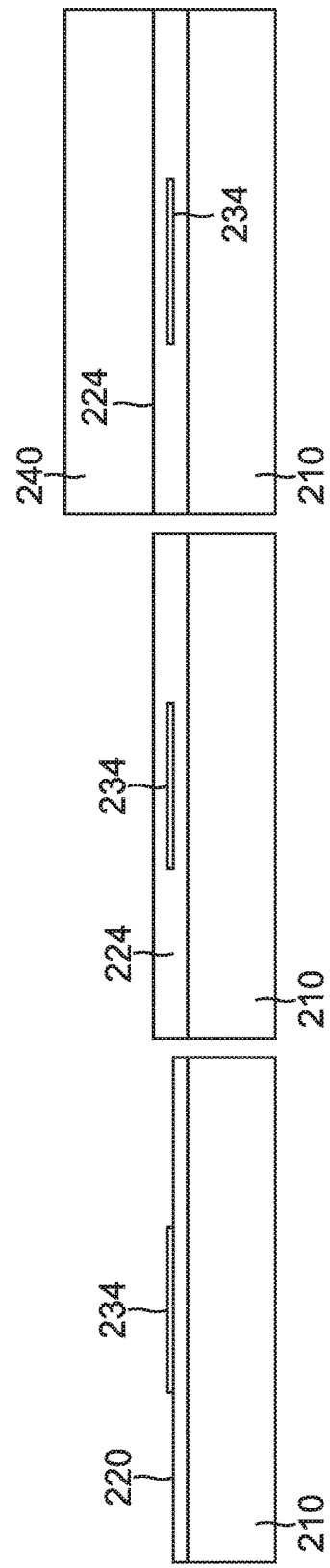

ETCHLESS ACOUSTIC WAVEGUIDING IN INTEGRATED ACOUSTO-OPTIC WAVEGUIDES

CROSS REFERENCE TO RELATED APPLICATION

This application claims the benefit of priority to U.S. Provisional Application No. 62/397,068, filed on Sep. 20, 2016, which is herein incorporated by reference.

STATEMENT REGARDING FEDERALLY SPONSORED RESEARCH OR DEVELOPMENT

This invention was made with Government support under N66001-16-C-4017 awarded by SPAWAR Systems Center Pacific. The Government has certain rights in the invention. This material is based upon work supported by the Defense Advanced Research Projects Agency (DARPA) and Space and Naval Warfare Systems Center Pacific (SSC Pacific).

BACKGROUND

The simultaneous guiding of both optical and acoustic waves is an attractive capability for integrated platforms, because it allows for the tunable enhancement of such interesting and advantageous effects as Brillouin scattering. However, present techniques to include acoustic waveguiding in optical platforms typically rely on the introduction of air/solid material boundaries which, in addition to complicating fabrication, increase scattering loss for both the optical and acoustic waves.

SUMMARY

An acousto-optic waveguide device comprises a substrate comprising a first material having a first refractive index and a first acoustic velocity; a cladding layer over the substrate, the cladding layer comprising a second material having a second refractive index that is distinct from the first refractive index, the second material having a second acoustic velocity that is distinct from the first acoustic velocity; and an optical core surrounded by the cladding layer, the optical core comprising a third material having a third refractive index that is higher that the first refractive index and the second refractive index, the third material having a third acoustic velocity that is distinct from the first acoustic velocity and the second acoustic velocity. The cladding layer that surrounds the optical core has a thickness configured to substantially confine acoustic waves to the cladding layer when an optical signal propagates through the optical core.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which:

FIGS. 1A and 1B are cross-sectional end views of an acousto-optic waveguide device, according to one embodiment;

FIGS. 2A-2F are end views showing an exemplary method of fabricating an acousto-optic waveguide device;

DETAILED DESCRIPTION

Figure 3:
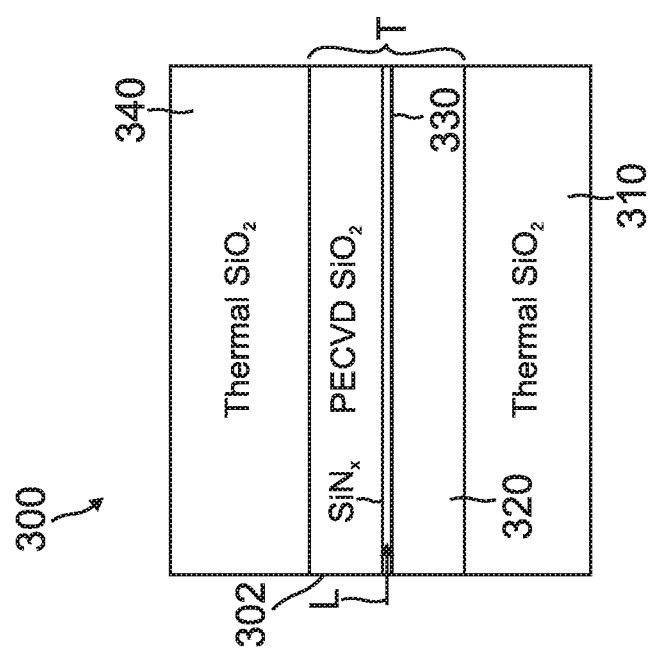
FIG. 3 is a cross-sectional side view of an acousto-optic waveguide device, according to an exemplary embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Integrated acousto-optic waveguide devices are provided that are configured to have etchless acoustic waveguiding features. The waveguide devices are fabricated in such a way that acoustic confinement does not rely on a material etch, but instead makes use of acoustic reflection at interfaces between two solids with dissimilar acoustic velocities.

In comparison to prior techniques, the present approach achieves acoustic waveguiding by surrounding an optical waveguide section with a material possessing an acoustic velocity (or speed of sound through the material) that is distinct from the rest of the materials in the optical waveguide section. In addition to providing a waveguide device that is readily fabricated, the present technique has a negligible effect on the properties of the optical core of the waveguide device.

Furthermore, the low velocity contrast used to achieve acoustic waveguiding yields a low acoustic loss coefficient, providing a further enhancement to effects which rely on the co-propagation of the optical and acoustic waves. Lateral acoustic confinement is not provided by the present technique, but, if the lateral area of the optical mode is sufficiently large (e.g., about 3-5 microns), the acoustic wave will have minimal divergence in the lateral direction, and thus confinement along that direction will not be necessary.

During operation of the acousto-optic waveguide device, as light propagates through the waveguide device the light generates acoustic waves through electrostriction. By providing a waveguiding material having a sufficiently large elasto-optic effect, the present waveguide device has Brillouin scattering at a rate significantly larger than that of waveguides that which do not possess the acoustic confinement introduced through the present technique.

Further details of the present waveguide device and a method for fabrication are described hereafter with reference to the drawings.

FIGS. 1A and 1B illustrate an acousto-optic waveguide device 100, according to one embodiment. The waveguide device 100 generally includes a substrate 110, a cladding layer 120 over substrate 110, and an optical core 130 embedded in and surrounded by cladding layer 120. An optional top layer 140 may be over cladding layer 120.

FIG. 1A depicts the optical waveguide material properties of waveguide device 100. The substrate 110 is composed of a first material having a first refractive index ($n_1$), and cladding layer 120 is composed of a second material having a second refractive index ($n_2$) that is distinct from the first refractive index. The optical core 130 is composed of a third material having a third refractive index ($n_3$) that is greater than both the first refractive index and the second refractive index, such that an optical signal will propagate through optical core 130. The optional top layer 140 may be composed of the same first material as substrate 110 having the first refractive index.

FIG. 1B depicts the acoustic waveguide material properties of waveguide device 100. The first material of substrate 110 has a first acoustic velocity ($v_1$), and the second material of cladding layer 120 has a second acoustic velocity ($v_2$) that is distinct from the first acoustic velocity. The third material of optical core 130 has a third acoustic velocity ($v_3$) that is distinct from the second acoustic velocity of the second material and the first acoustic velocity of the first material. When the optional top layer 140 is composed of the same first material as substrate 110, the material of top layer 140 also has the first acoustic velocity.

The optical core 130 can be composed of various materials, such as silicon, silicon nitride (SiNx), silicon oxynitride (SiON), silicon carbide (SiC), diamond, silicon germanium (SiGe), germanium, gallium arsenide (GaAs), gallium nitride (GaN), gallium phosphide (GaP), lithium niobate ($LiNbO_3$), or combinations thereof. The optical core 130 can be formed to have a thickness of about 20 nm to about 100 nm, for example.

The cladding layer 120 can be composed of various materials, such as silicon dioxide ($SiO_2$), silicon oxynitride, zinc oxide (ZnO), aluminum oxide ($Al_2O_3$), calcium fluoride ($CaF_2$), or combinations thereof. The cladding layer 120 can be formed to have a thickness of about 4 μm to about 10 μm, for example.

The substrate 110 can be composed of any wafer material that is atomically flat, such as any of the above materials. The optional top layer 140 can also be composed of any of the above materials.

The substrate 110, cladding layer 120, and optional top layer 140 can be formed of the same material and thus have the same chemical composition, but in this case are tailored to have differing properties depending on the fabrication methods employed. For example, substrate 110 and top layer 140 can be formed with a thermal oxide such as thermal $SiO_2$, which has a first density, and cladding layer 120 can be formed with a plasma enhanced chemical vapor deposition (PECVD) oxide such as PECVD $SiO_2$, which has a second density different from the first density of the thermal $SiO_2$. Other properties that can be tailored include fabrication of the respective layer materials to be amorphous and crystalline. Alternative methods for fabricating the layer materials include sputtering, low pressure CVD, atomic layer deposition, or the like.

FIGS. 2A-2F depict an exemplary method of fabricating an acousto-optic waveguide device. Fabrication of the waveguide device begins with a wafer substrate 210 having an upper surface 212, as shown in FIG. 2A. The wafer substrate 210 can be formed of a first material comprising, for example, a thermal oxide as its topmost layer, with the first material having a first refractive index and a first acoustic velocity.

Next, an initial amount of a second material is deposited over upper surface 212 of wafer substrate 210 to form a partial cladding layer 220, as shown in FIG. 2B. The second material has a second refractive index that is distinct from the first refractive index of the first material. The second material also has a second acoustic velocity that is distinct from the first acoustic velocity of the first material. For example, partial cladding layer 220 can be formed by depositing about 2-4 microns of an acoustically dense dielectric material, such as PECVD-deposited silicon dioxide, which has a higher acoustic velocity than thermal oxide.

Thereafter, a third material is deposited over partial cladding layer 220 to form an optical layer 230, as depicted in FIG. 2C. The third material has a third refractive index that is greater than the first refractive index of the first material and the second refractive index of the second material. The third material also has a third acoustic velocity that is distinct from the first acoustic velocity of the first material and the second acoustic velocity of the second material. For example, optical layer 230 can be formed by depositing about 20-100 nm of a dielectric material with a refractive index higher than any of the other constituent materials. In one implementation, the dielectric material of optical layer 230 is PECVD-deposited silicon nitride.

As shown in FIG. 2D, an optical core structure 234 is formed by removing portions of the third material of optical layer 230 to expose portions of partial cladding layer 220, with optical core structure 234 comprising the remaining third material. For example, optical core structure 234 can be formed by etching optical layer 230, such as through conventional electron-beam lithography or photolithography-based procedures.

An additional amount of the second material is then deposited over optical core structure 234 and the exposed portions of partial cladding layer 220 to form a full cladding layer 224 that surrounds optical core structure 234, as depicted in FIG. 2E. For example, the additional amount of the second material can be about 2-4 microns of the acoustically dense dielectric material, such as PECVD-deposited silicon dioxide.

In an optional step shown in FIG. 2F, a top layer 240 can be formed over full cladding layer 224. The top layer 240 can be formed by depositing the same first material used to form substrate 210, such as the thermal oxide having a lower acoustic velocity. The top layer 240 is optional since it is not necessary for acoustic confinement of the acousto-optic waveguide device.

FIG. 3 illustrates an acousto-optic waveguide device 300, according to an exemplary embodiment, which can be fabricated as described previously. The waveguide device 300 generally includes a substrate 310, which can be composed of thermal $SiO_2$, for example. A cladding layer 320 is over substrate 310, and an optical core 330 is embedded in cladding layer 320. The cladding layer 320 can be composed of PECVD-deposited $SiO_2$, for example, and has a given thickness (T) such as about 4 μm to about 10 μm. The optical core 330 can be composed of silicon nitride ($SiN_x$), for example. An optional top layer 340 may be over cladding layer 320 and can be composed of thermal $SiO_2$, for example. As illustrated in FIG. 3, during operation of waveguide device 300, light (L) is coupled into an edge 302, and as the light propagates through optical core 330, the light will generate acoustic waves through electrostriction. If the waveguiding material has a sufficiently large elasto-optic effect, this will give rise to Brillouin scattering at a significantly larger rate.

Figure 4:
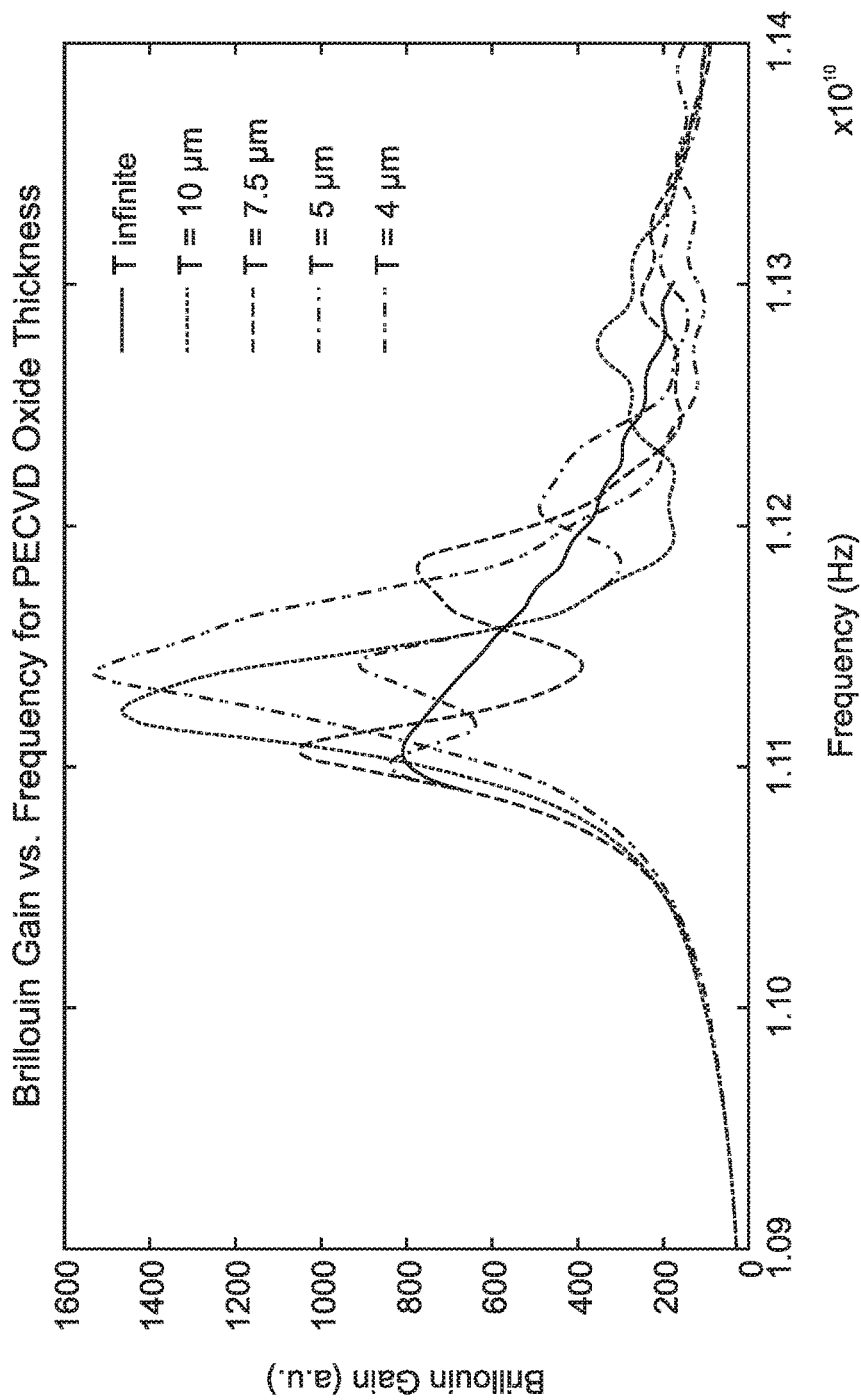
FIG. 4 is a graph of a simulated gain coefficient for the acousto-optic waveguide device of FIG. 3.

FIG. 4 is a graph of a simulated gain coefficient for acousto-optic waveguide device 300 (FIG. 3). The graph of FIG. 4 shows plots of Brillouin gain with respect to frequency for different thicknesses (T) of cladding layer 320 composed of a PECVD oxide. As shown in FIG. 4, the Brillouin gain increases with respect to frequency as the thickness of the PECVD oxide decreases from 10 μm down to 4 μm.

The acousto-optic waveguide device disclosed herein may be used, for example, in an integrated photonics circuit, in either a straight waveguide or a resonator, to couple energy from a forward propagating pump wave into a counter-propagating Stokes wave. This process may be cascaded multiple times, corresponding to the generation of higher-order Stokes waves propagating in alternating directions. The Stokes waves may act as carriers for data encoded in the optical regime, may serve to monitor the Sagnac effect in optical gyroscopes, or may monitor the temperature and stress in the constituent integrated photonics circuit.

Figure 5:
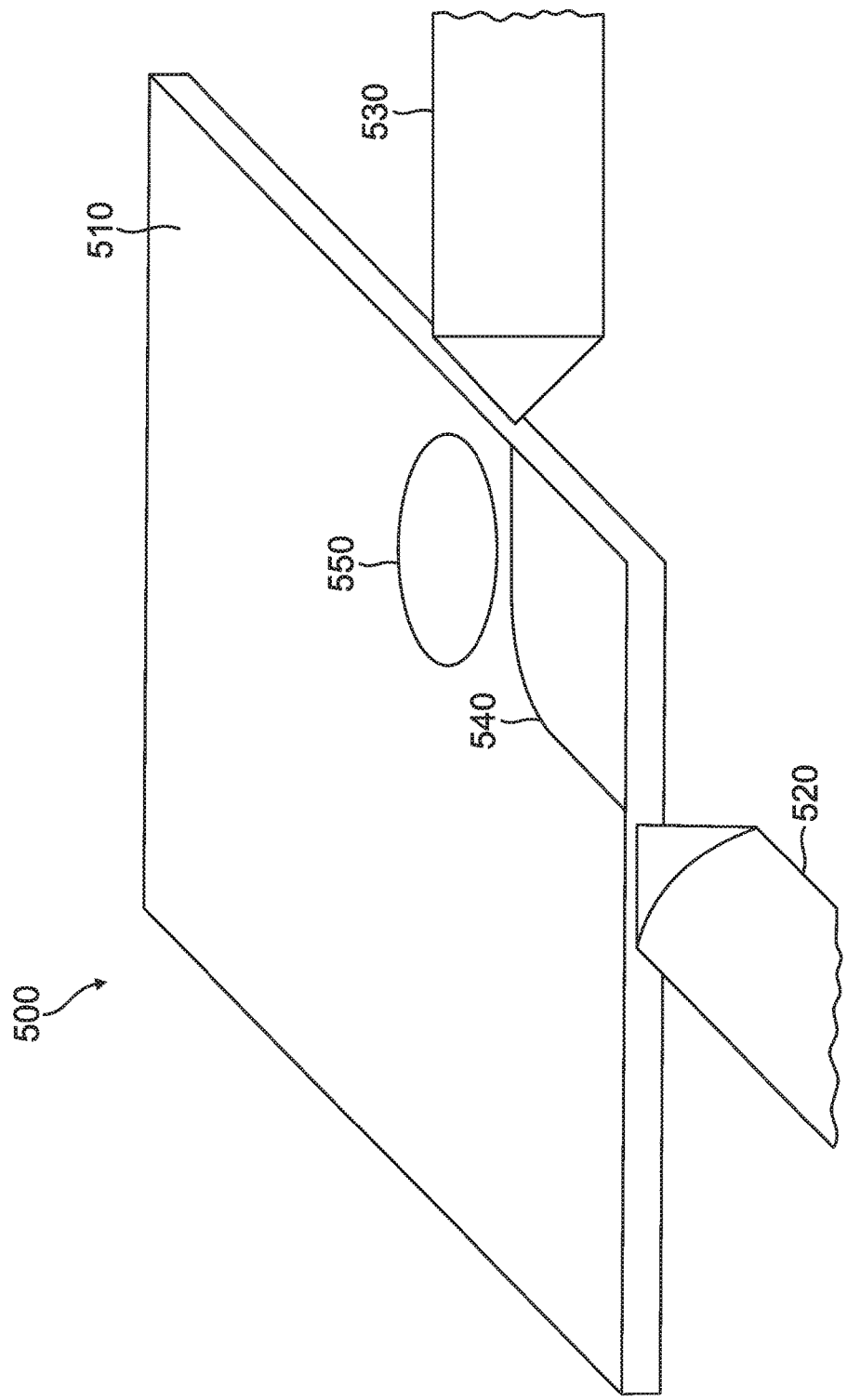
FIG. 5 is a perspective view of an integrated fiber optic gyroscope that can employ an acousto-optic waveguide, according to an exemplary embodiment.

FIG. 5 illustrates an example of an integrated fiber optic gyroscope 500, which can employ the acousto-optic waveguide device. The fiber optic gyroscope 500 includes an integrated photonics circuit or chip 510, which is in optical communication with an input optical fiber 520 and an output optical fiber 530. The input optical fiber 520 directs a light beam from a source to an acousto-optic waveguide 540 in chip 510. Counter-propagating light beams are generated in one or more ring resonators 550 coupled to acousto-optic waveguide 540 in chip 510. The beat frequencies of the counter-propagating light beams are used to determine the rate of rotation based on output optical signals received by output optical fiber 530.

EXAMPLE EMBODIMENTS

Example 1 includes an acousto-optic waveguide device comprising: a substrate comprising a first material having a first refractive index and a first acoustic velocity; a cladding layer over the substrate, the cladding layer comprising a second material having a second refractive index that is distinct from the first refractive index, the second material having a second acoustic velocity that is distinct from the first acoustic velocity; and an optical core surrounded by the cladding layer, the optical core comprising a third material having a third refractive index that is higher that the first refractive index and the second refractive index, the third material having a third acoustic velocity that is distinct from the first acoustic velocity and the second acoustic velocity; wherein the cladding layer that surrounds the optical core has a thickness configured to substantially confine acoustic waves to the cladding layer when an optical signal propagates through the optical core.

Example 2 includes the acousto-optic waveguide device of Example 1, further comprising a top layer over the cladding layer.

Example 3 includes the acousto-optic waveguide device of Example 2, wherein the top layer comprises the first material.

Example 4 includes the acousto-optic waveguide device of any of Examples 1-3, wherein the first and second materials have the same chemical composition, but have different densities.

Example 5 includes the acousto-optic waveguide device of any of Examples 1-4, wherein the second material comprises silicon dioxide, silicon oxynitride, zinc oxide, aluminum oxide, calcium fluoride, or combinations thereof.

Example 6 includes the acousto-optic waveguide device of any of Examples 1-5, wherein the third material comprises silicon, silicon nitride, silicon oxynitride, silicon carbide, diamond, silicon germanium, germanium, gallium arsenide, gallium nitride, gallium phosphide, lithium niobate, or combinations thereof.

Example 7 includes the acousto-optic waveguide device of any of Examples 1-6, wherein the waveguide device is implemented in an integrated photonics circuit or chip.

Example 8 includes the acousto-optic waveguide device of Example 7, wherein the integrated photonics circuit or chip is part of a fiber optic gyroscope.

Example 9 includes a method of fabricating an acousto-optic waveguide device, the method comprising: providing a wafer substrate having an upper surface, the wafer substrate comprising a first material having a first refractive index and a first acoustic velocity; depositing an initial amount of a second material over the upper surface of the wafer substrate to form a partial cladding layer, the second material having a second refractive index that is distinct from the first refractive index, the second material having a second acoustic velocity that is distinct from the first acoustic velocity; depositing a third material over the partial cladding layer to form an optical layer, the third material having a third refractive index that is greater than the first refractive index and the second refractive index, the third material having a third acoustic velocity that is distinct from the first acoustic velocity and the second acoustic velocity; removing portions of the third material of the optical layer to expose portions of the partial cladding layer and form an optical core structure comprising the remaining third material; and depositing an additional amount of the second material over the optical core structure and the exposed portions of the partial cladding layer to form a full cladding layer that surrounds the optical core structure.

Example 10 includes the method of Example 9, further comprising forming a top layer over the full cladding layer.

Example 11 includes the method of Example 10, wherein the top layer comprises the first material.

Example 12 includes the method of any of Examples 9-11, wherein the first and second materials have the same chemical composition, but have different densities.

Example 13 includes the method of any of Examples 9-12, wherein the second material comprises silicon dioxide, silicon oxynitride, zinc oxide, aluminum oxide, calcium fluoride, or combinations thereof.

Example 14 includes the method of any of Examples 9-13, wherein the third material comprises silicon, silicon nitride, silicon oxynitride, silicon carbide, diamond, silicon germanium, germanium, gallium arsenide, gallium nitride, gallium phosphide, lithium niobate, or combinations thereof.

Example 15 includes the method of any of Examples 9-14, wherein the wafer substrate comprises a thermal oxide.

Example 16 includes the method of any of Examples 9-15, wherein the second material and the third material are deposited using a process comprising plasma enhanced chemical vapor deposition (PECVD), low pressure CVD, sputtering, or atomic layer deposition.

Example 17 includes the method of Example 16, wherein the second material comprises PECVD-deposited silicon dioxide, and the third material comprises PECVD-deposited silicon nitride.

Example 18 includes the method of any of Examples 9-17, wherein the portions of the third material are removed by a process comprising electron-beam lithography or a photolithography-based procedure.

Example 19 includes the method of any of Examples 9-18, wherein the full cladding layer is formed to have a thickness of about 4 µm to about 10 µm; and the optical core structure is formed to have a thickness of about 20 nm to about 100 nm.

Example 20 includes the method of any of Examples 9-19, wherein the acousto-optic waveguide device is formed as part of an integrated photonics circuit or chip.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. An acousto-optic waveguide device, comprising:
    a substrate comprising a first material having a first refractive index and a first acoustic velocity;
    a cladding layer over the substrate, the cladding layer comprising a second material having a second refractive index that is distinct from the first refractive index, the second material having a second acoustic velocity that is distinct from the first acoustic velocity; and
    an optical core embedded in and surrounded by the cladding layer, the optical core comprising a third material having a third refractive index that is higher that the first refractive index and the second refractive index, the third material having a third acoustic velocity that is distinct from the first acoustic velocity and the second acoustic velocity;
    wherein the cladding layer that surrounds the optical core has a thickness configured to substantially confine acoustic waves to the cladding layer when an optical signal propagates through the optical core.

2. The acousto-optic waveguide device of claim 1, further comprising a top layer over the cladding layer.

3. The acousto-optic waveguide device of claim 2, wherein the top layer comprises the first material.

4. The acousto-optic waveguide device of claim 1, wherein the first and second materials have the same chemical composition, but have different densities.

5. The acousto-optic waveguide device of claim 1, wherein the second material comprises silicon dioxide, silicon oxynitride, zinc oxide, aluminum oxide, calcium fluoride, or combinations thereof.

6. The acousto-optic waveguide device of claim 1, wherein the third material comprises silicon, silicon nitride, silicon oxynitride, silicon carbide, diamond, silicon germanium, germanium, gallium arsenide, gallium nitride, gallium phosphide, lithium niobate, or combinations thereof.

7. The acousto-optic waveguide device of claim 1, wherein the waveguide device is implemented in an integrated photonics circuit or chip.

8. The acousto-optic waveguide device of claim 7, wherein the integrated photonics circuit or chip is part of a fiber optic gyroscope.

* * * * *